United States Patent

Harper et al.

[15] 3,669,103
[45] June 13, 1972

[54] ABSORBENT PRODUCT CONTAINING A HYDROCELLOIDAL COMPOSITION

[72] Inventors: Billy Gene Harper; Robert Niles Bashaw; Bobby Leroy Atkins, all of Lake Jackson, Tex.

[73] Assignee: The Dow Chemical Company, Midland, Mich.

[22] Filed: May 31, 1966

[21] Appl. No.: 553,684

[52] U.S. Cl. ........................128/156, 117/136, 128/284, 260/88.1
[51] Int. Cl. ........................................A61l 15/00
[58] Field of Search..............128/156, 284, 285, 287, 290, 128/296; 3/1, 36; 260/47, 77.5, 88.1; 117/136

[56] References Cited

UNITED STATES PATENTS

| | | | |
|---|---|---|---|
| 3,220,960 | 11/1965 | Wichterle et al. | 3/1 |
| 2,750,944 | 6/1956 | Tollstrup | 128/290 |
| 2,810,716 | 10/1957 | Markus | 260/88.1 |
| 3,078,849 | 2/1963 | Morse | 128/290 |
| 3,229,769 | 1/1966 | Bashaw et al. | 117/136 |
| 3,279,996 | 10/1966 | Long, Jr. et al. | 3/1 |
| 3,306,966 | 2/1967 | Matejcek et al. | 128/285 |
| 3,340,875 | 9/1967 | Dudley et al. | 128/290 |
| 3,344,789 | 10/1967 | Arnold et al. | 128/287 |

OTHER PUBLICATIONS

The Bulletin, of Vol. 5, No. 3, July 1963, Vol. 6, No. 2, April 1964, Dow Corning Center for Aid to Medical Research.

Primary Examiner—Charles F. Rosenbaum
Attorney—Griswold & Burdick

[57] ABSTRACT

Articles having improved absorbency for aqueous body fluids consist of body-conforming supports containing dry, solid water-swellable, water-insoluble polymeric sorbents which are lightly cross-linked polymers, such as polyvinylpyrrolidones, sulfonated polystyrenes, sulfonated polyvinyltoluenes, polysulfoethyl acrylates, poly-2-hydroxyethyl acrylates, polyacrylates, hydrolyzed polyacrylamides and copolymers of acrylamide with acrylic acid.

Illustrative of the im55

8 Claims, No Drawings

ABSORBENT PRODUCT CONTAINING A HYDROCELLOIDAL COMPOSITION

The present invention is concerned with the relatively stable sorption of aqueous fluids and is particularly directed to substances which do sorb, structures which carry the said sorbent substances, and methods for the sorption of aqueous fluids particularly in situations in which it is desired to sorb the aqueous fluid stably and in a manner which is reversible only with great difficulty.

The present invention finds its principal use in the sorption of fluids elaborated in the normal or pathological functioning of the body of a warm-blooded animal. In some circumstances it is more widely usable and may be employed wherever it is desired to sorb an aqueous fluid. The sorbent of the present invention is a polymer, typically a co-polymer derived from monomers which, or a major proportion of which, homopolymerized alone, would be water soluble; but are here lightly cross-linked in manners known in polymer synthesis and preparation.

The monomers to be employed are mono-unsaturated, in the sense that each unit, typically a monomer or low polymer when simply polymerized, yields linear polymers and by the fact that, if homopolymerized, the homopolymers are water soluble. However, it is pointed out that mixtures of these monomers can also be polymerized to obtain copolymers including terpolymers and polymers presenting a wide variety of monomeric members. If not cross-linked, as by polymerizing in mixture with polyfunctional, cross-linking monomer, these copolymers are also water soluble.

In the present invention, light cross-linked polymers otherwise as described above, including mixed polymers representing diverse monomeric species, are not only to be employed, but represent some of the most effective embodiments of the invention.

When it is desired to obtain recurring moieties of some kinds, such as carboxyl-bearing and carboxylate-bearing moieties, sulfonate and sulfonic-bearing moieties, and the like, the synthetic route of choice may not call for the monomers bearing such functions. Rather it may be less expensive to provide a monomer which, after polymerization, admits of ready modification to provide such function.

Thus, for instance, when a polymer is desired that may appear to be a copolymer of acrylamide and acrylate, it may be preferred to produce first a homopolymeric acrylamide and, after polymerization, to hydrolyze in part, to obtain a product as though a copolymer of acrylamide and acrylic acid, and thereafter to neutralize the carboxyl groups produced by hydrolysis. Similarly, instead of mixing monomers of styrene and sodium styrene sulfonate, it may be preferred to homopolymerize styrene and thereafter sulfonate it in part and, following sulfonation, to neutralize the resulting sulfonic moieties.

It is immaterial in the present invention whether a copolymeric material here to be employed be prepared by supplying separate monomers and thereafter copolymerizing them, or by supplying monomer of one kind, homopolymerizing, and thereafter modifying a part, only, of the resulting recurring moieties, to attain essentially the same product as would be attained from copolymerization.

Cross-linking necessary to the present invention is readily achieved in manners known in the polymer arts; as, by irradiation, or the incorporation into a monomer mixture to be polymerized of known chemical cross-linking monomeric agents such as divinylbenzene, the divinylether of diethylene glycol, N,N'-methylene bisacrylamide; and the like. The manner of cross-linking is not critical. When a monomeric difunctional chemical cross-linking agent is incorporated into a monomer mixture to be polymerized to obtain a naturally cross-linked polymer (which is actually a co-polymer by reason of the presence of the cross-linking agent) to be used according to the present invention, usually from about 0.05 to about 1.5 percent of cross-linking agent and preferably about 0.10 to about 0.9 percent of cross-linking agent by weight of total polymeric mixture will yield products of preferred properties. When cross-linking is induced in known manners by radiation, about the same degree of cross-linking should be achieved.

Those skilled in the polymer art, will recognize that, for purposes of this invention the extent of cross-linking desired is enough to render the resulting cross-linked polymers water insoluble, greatly water-swellable, bibulous; the separate particles, when swollen by imbibition of an aqueous fluid, not coalescing but remaining discrete although possibly moderately coherent.

The preparation of representative polymers of this invention is now exemplified.

EXAMPLE 1

A 50 percent aqueous solution of N-vinyl-pyrrolidone monomer was exposed for two hours in a reaction vessel to a gamma ray source providing radiation at the rate of 0.16 megarad per hour. Under the radiation bombardment, in manners incompletely known as to chemical mechanism but well defined as to results, the monomer was polymerized and lightly cross-linked, and the preparation which entered the reactor as a viscous aqueous solution was brought out as an insoluble, deformable soft solid.

This substance was cut into dice and subdivided so as to provide large surface exposure to evaporative removal of water. Water was thereafter evaporated to apparent dryness and, as desired, further finely ground or pulverized to obtain a finely particulate product.

EXAMPLE 2

In a 3 liter flask were combined 450 grams monomeric N-vinylpyrrolidone, 2.25 grams of the $\alpha,\omega$-divinylether of diethylene glycol, 0.45 milliliter of 1-amino-2-propanol, and, as polymerization catalyst, 0.90 grams of $\alpha,\alpha'$-azobisisobutyronitrile, all these substances together with 1,800 milliliters water. The resulting mixture was heated at 70°–80° C. for 8 hours under nitrogen blanket and with continuous nitrogen purge. As a result of these operations there was obtained, in aqueous dispersion, a lightly cross-linked polymer of N-vinylpyrrolidone cross-linked with the saturated residue of the divinyl ether of diethylene glycol. The resulting preparation was removed from the flask in which it was prepared, placed on trays and warmed in a vacuum evaporator to remove water and obtain the lightly cross-linked polymer as a glassy solid. The resulting polymer solid, in irregular form was thereafter ground to desired fineness to obtain a usable powder.

EXAMPLE 3

In a 3 liter flask were combined 100 grams monomeric N-vinylpyrrolidone, 0.7 grams N,N'-methylenebisacrylamide and, as polymerization catalyst 0.3 grams $\alpha,\alpha'$-asobisisobutyronitrile, all these substances mixed together with 500 milliliters water. The resulting mixture was heated at 70°–80° C. for 8 hours under nitrogen blanket and with stirring and with continuous nitrogen purge, to obtain, in aqueous dispersion, a polymer of N-vinylpyrrolidone lightly cross-linked with the saturated residue of the N,N'-methylenebisacrylamide. The resulting product was a coherent mass of gel with no visible amounts of unretained aqueous liquid.

The gel was removed from the flask, placed in a glass pan in a vacuum evaporator, and with warming and under subatmospheric pressure, water was evaporated to apparent product dryness and thereafter ground to obtain a finely particulate product.

EXAMPLE 4:

In preparations essentially the same as those of Example 3 foregoing but employing 100 grams monomeric N-vinylpyrrolidone and 0.5 percent divinylbenzene there was obtained a gel which, upon preparation, evaporative drying, grinding, and rewetting, sorbed to obtain a loosely associated particulate gel, in which 2 weight percent of polymer held 98 weight percent of water readily.

Cross-linked polyglycol polymers, which may be regarded as certain highly specialized forms of polyurethane polymers are also useful in the present invention, including the polymers set forth in U.S. Pat. Nos. 3,054,778 and 3,164,565.

EXAMPLE 5

The following procedure is carried out for the preparation of a water swellable polyglycol:

Into a mixing kettle containing 6,000 pounds of kerosene was added 2.5 percent by weight of Bentone 38 based on kerosene.

The expression "Bentone" is a registered trade mark for a group of ion-exchange modified clays. Bentone 38, in particular, is a dimethyl-di (tallow oil alkyl) ammonium derivative of a magnesium montmorillonite (Hectorite Clay). It was used here as an aid to particulating the resulting polymer. Then acetone (40 percent by weight based on Bentone) was added to aid the dispersion of the Bentone. This mixture was then agitated by stirring until its viscosity was greater than 300 centipoises. About 4,800 pounds of dry polyethylene glycol of average molecular weight of about 9,000 was fed into the reactor which had been heated to 90° C., at a rate of about 1,000 to 1,250 pounds per hour. The temperature was maintained at 80°-90° C. A heat stabilizer product was then added to the mixture and the temperature raised to 110° C. The theoretical amount of toluene diisocyanate based on the hydroxyl groups present in the polyglycol was then added, followed by a quantity of triethylene diamine sufficient to obtain a pH of from 8-9 in the mixture. The reaction was allowed to continue for 1 hour at 80° C.

The reaction was stopped by adding 15 percent HCl to the slurry until the pH was 5 or 6. The particulate polymer was separated from the slurry by filtration and the excess kerosene absorbed by Fuller's earth which was then separated by sieving from the larger particles of polymer.

EXAMPLE 6

To a polymerization reaction vessel was charged acrylamide and water in relative proportions to prepare a 10 percent solution of the monomer. N,N'-methylenebisacrylamide was added to the resulting solution in an amount of 0.092 mole percent based on the moles of acrylamide (2,000 parts per million parts of acrylamide monomer). The pH of the reaction system was adjusted to 6.4 and the temperature adjusted to about 35° C. At this point the reaction vessel was purged with nitrogen for about 30 minutes and thereafter sealed maintaining the reaction system under a nitrogen blanket. Polymerization was initiated by addition to the system of a catalytic amount of potassium persulfate, about 0.05 percent based on the weight of the monomer. After an initial period of about 15 minutes during which the polymerization proceeded adiabatically, the temperature of the system was increased to 85° C. and held there for about 2 hours.

The polymer gel thus produced was cooled to room temperature. Sufficient potassium hydroxide in the form of a 5 percent water solution thereof was added to the gel to hydrolyze about 30 mole percent of the available carboxamide groups to the corresponding carboxylate groups. The hydroxide solution was thoroughly mixed with the polymer gel and the resulting mixture maintained at 75° C. for 18 hours. The cross-linked terpolymer of acrylamide, sodium acrylate and N,N'-methylenebisacrylamide thus prepared was dried and ground to a fine, free flowing powder which had a swelling capacity of 860 grams in water.

Other monomeric substances the homopolymers of which are uniformly water soluble, the lightly cross-linked polymers (which can be regarded as co-polymers by reason of the presence of at least the cross-linking monomer,) which can be polymerized to obtain cross-linked water-insoluble, water- swellable polymers of the present invention include the alkali metal salts, such as the sodium salt of sulfonated vinyl toluene which can be prepared by sulfonating vinyl toluene and thereafter neutralized before or after polymerization; similarly, an alkali metal salt, such as the sodium salt of sulfonated styrene, sodiosulfoethyl acrylate; β-hydroxy ethyl acrylate, and vinylmethyloxazolidinone which will usually be 3-vinyl-5-methyloxazolidinone but of which the other isomers are available also.

It is uniformly characteristic of the polymers of the present invention that a graph representing, vectorially, water absorption as a function of applied pressure and, reciprocally, water desorption or expression as a function of applied pressure, presents a pattern that can be regarded as a hysteresis loop. It is an especially advantageous characteristic of the water sorption of the polymers of the present invention that this hysteresis loop indicates an outstanding spread between the conditions necessary to effect absorption of aqueous fluids and the conditions under which pressure desorption or release results. Because of this characteristic property, the present substances are extraordinarily advantageous for use in situations in which it is desired to sorb large quantities of aqueous fluid and retain them securely in the face of pressures deformative of the polymer sorbent. Over a relatively wide range of water absorption concentration, it can be generalized that pressure and physical deformation alone have essentially no effect upon the release of water from the polymers of the present invention.

Illustrative of the importance of this fact, a baby diaper prepared from a water-insoluble supporting structure which can be fabric, and carrying, in a way to be retained as in a closed bag, particulate sorbent of the present invention, absorbs large quantities of aqueous fluid with essentially no tendency to release the fluid when exposed to pressure and deformation of the resulting mass of fluid-bearing polymer. In contrast, a sponge or an absorbent cotton fabric manifests a very low spread of the said hysteresis loop at more than minimal water absorption concentrations. Also, the polymers of the present invention, when sorbed with relatively large amounts of water, have little tendency to synerese. Thus, in contrast with thermosoluble polymers such as gelatin and pectin, at relative levels of water concentration in which syneresis would be conspicuous, surfaces of the present polymer show little or no tendency to "bleed."

The polymers of the present invention, like most polymers, are essentially innocuous in contact with human tissue. The polymers are adapted to be used in direct contact with minor cuts and abrasions and ordinarily also with major cuts sectioning major blood vessels. Hence, the polymers of the present invention are extraordinarily useful in stanching of the flow of blood and can be incorporated into face-powders, lotions, bandages and the like.

EXAMPLE 7

An ear of a live rabbit was examined against a strong light and a small artery precisely located. A longitudinal section through the skin and into the artery resulted in profuse bleeding. Onto a small approximately 2 inch square piece of folded gauze, approximately 0.1 gram of poly N-vinylpyrrolidinone lightly cross-linked with gamma radiation in the method described, hereinabove, was applied as a loose dust and pressed against the wound and held for about 30 seconds. Thereafter, the gauze was removed, and it was observed that all bleeding had stopped and a structure comprising the water-swellable polymer of the present invention together with sorbed blood, giving an appearance closely resembling that of a natural clot, was observed.

The animal was maintained under observation for a period of time and the clot remained essentially unmodified until the wound had healed. Healing of the wound was examined and found to be apparently normal. It is a useful aspect of the employment of the polymers of the present invention in control of bleeding that the clot-like structure formed in this manner has much less tendency to shrink than does a normal clot of blood. Reasoning teleologically one might assume that the normal shrinkage serves a purpose useful in a primitive, unbandaged management of a wound, in that some approximation of the cut surfaces occurs. When this is desired, if it is preferred also to stanch the flow of blood with the present polymer, means of approximation, such as bandage or sutures, will be used.

In contrast, when this is a matter of indifference, of when approximation of the wound is not desired, the employment of the polymers of the present invention is advantageous in that, as the blood clots, with the polymer, it causes little or no dimensional change in the wound site.

In such uses as in dusting powders for use after shaving, this consideration can usually be ignored.

EXAMPLE 8

The present example is carried out essentially as Example 7, foregoing, except that the employed polymer was mixed with physiological saline water to obtain a thick paste. This paste, representing partial, but far less than complete, saturation of the polymer with water was then applied, without support, to an incision similar to that described in Example 7 foregoing. The polymer paste could be seen slowly to perfuse with blood resulting in characteristic color change, and the flow of blood was permanently stanched. The wound was observed over a period of time and healing was seen to follow essentially the course of that described, foregoing.

EXAMPLE 9

Into a bottle of approximately 100 milliliters capacity was measured 50 milliliters citrated whole human blood. Thereto was added N,-vinylpyrrolidinone radiation cross-linked in the manner hereinbefore described in a quantity sufficient that the pyrrolidinone polymer represented 2 weight percent of the entire resulting mixture. The dry polymer and the blood were shaken together, permitted to stand for a few minutes, and then observed and tested by shaking, probing, pouring, and the like and found to comprise a stringy gel having many of the apparent properties of a natural blood clot.

EXAMPLE 10

The procedures of the present example were essentially the same as those of Example 9 except that the employed polymer was polymeric vinylpyrrolidinone cross-linked with 0.5 percent divinylether of diethylene glycol by weight of total employed monomer. Sorption was essentially the same but, perhaps as a function of particle size, the resulting gel-like structure was composed of swollen, non-coalescent, physically separate particles. Sorption of the blood was apparently complete except for small amounts of moisture remaining on the wall of the bottle.

EXAMPLE 11

The procedures of the present example were essentially the same as those of Example 9, foregoing, except that the polymer was identical with the polymer in Example 10. The polymer of this example, when mixed with the blood sample, gave a fibrinous gel closely resembling a natural blood clot.

EXAMPLE 12

The present example was carried out in procedures essentially the same as those of Example 9 except that the employed polymer was polymeric N-vinylpyrrolidinone lightly cross-linked with 0.7 percent N,N'-methylenebisacrylamide by weight of total monomeric content.

In a hydrous association of 2 weight percent polymer and 98 weight percent blood, there was formed an agglomerated gel on irregularities of the surface of which small amounts of free relatively coherent liquid remained.

EXAMPLE 13

The procedures in the present example were essentially the same as those in Example 9 except that the employed polymer was polymeric N-vinylpyrrolidinone lightly cross-linked with 0.5 weight percent divinylbenzene as cross-linking agent.

Dispersed in blood at a concentration of 2 percent polymer and 98 percent blood, both by weight, there was formed a loosely coherent particulate gel mass. The particle boundaries represented approximately those of the original ground polymer except enlarged by swelling.

EXAMPLE 14

The present example was carried out in procedures essentially the same as those of Example 9 except that the polymer was a product from the cross-linking of a polyglycol with toluenediisocyanate, such as that of Example 5. The polyglycol was a polyethelene glycol of average molecular weight about 9,500, a specific gravity of 1.212 at 25° as referred to water at the same temperature; before cross-linking, soluble in all proportions in water; but cross-linked by reacting it with a small amount of toluenediisocyanate. The resulting polymer, loaded by sorption with blood, yielded a particulate gel, the particles of which absorbed blood relatively more slowly than the polymers described foregoing, but completely and practically irreversibly.

EXAMPLE 15

The present example was carried out in a manner essentially similar to the foregoing, except that the employed polymer was prepared from a polyethylene glycol having an average molecular weight of approximately 20,000, more lightly cross-linked with toluene diisocyanate, and the resulting gel, from the dispersion of 2 weight percent of the said polymer into 98 weight percent of blood, was somewhat less particulate than the particle of Example 14, foregoing, formed more quickly, and deemed more useful in the stanching of blood flow.

EXAMPLE 16

The present example was carried out essentially as those foregoing, and as in Example 9, except that the employed polymer was a poly potassium acrylate cross-linked with about 0.1 percent of N,N'-methylenebisacrylamide by weight of total monomeric charge.

At 1 weight percent concentration in 99 weight percent concentration of blood, the polymer of the present example gave a thick, cohesive, solid, soft, deformable gel closely resembling a newly-formed natural blood clot.

With only minimal attention to the identity of the chosen polymer, all the polymers of the present invention and in particular, fabricated articles presenting the polymers but supporting them are adapted to be employed in a wide range of sorptive functions. It is expressly contemplated that they will be used in bandages, surgical tampons, sorptive dental rolls, catamenial tampons, sanitary napkins, diapers, body urinals for use by persons suffering urinary incontinence, in which application the employment of the polymers in a thin plastic film bag provides an easily disposable unit, and the particulate polymers may well be employed; pads for the absorption of perspiration as in the underarm region; breast pads for the sorptive interception of milk; disposable sorbent hat bands, and in conjunction with drains, and similar surgical and medical means employed in the management of bodily fluids.

Also, the polymers of the present invention, and in particular, the polymers heavily sorbed with aqueous dispersions are useful in providing body feature restoration or modification, as in plastic surgery. The polymers, substantially free of impurities, are dispersed in water, or in physiological saline solution, or other fluid as desired, to obtain a relatively firm gel. The exact ratio of water or physiological saline solution or the like, to polymer, is not critical, but can be adjusted according to the properties of the polymer and the viscosity or rigidity desired. In this condition, the swollen polymer can be expressed through a surgical syringe and a surgical hollow needle of relatively large diameter such as about number 12 or larger. Expression of the polymer is rendered easier by the employment of a syringe with a screw-thread plunger drive, and it is preferred to employ a needle which attaches to the syringe by a locking mechanism.

With due regard for appropriate related surgical techniques such as aseptic conditions and the prudent choice of site for injection and the like, the polymers of the present invention are injected, typically subcutaneously, in any desired quantity and with control of distribution, in the restoration of surgically diminished or naturally deficient contoured body features. The employed polymer can thus be injected when of viscosity sufficiently great that it shows no perceptible tendency to return through the needle puncture.

As a further embodiment of the present invention, the aqueous fluid with which the polymer is loaded by sorption can be an aqueous dispersion of a natural hormone. Hormone concentration, identity, site, and the like can be selected with due regard for the known behavior of the hormone. In this situation, the exchange of solutes between the sorbed polymer mass and body fluids results in the slow release of hormone into the body. Thus the injected mass of hormone behaves at least temporarily essentially as an artificial endocrine gland. When desired, by injection, the hormone content of the polymer body can be increased or restored to an original level. Also, when desired, the polymer mass, or major portions of it, can be removed by aspiration that is essentially the reverse of injection, followed by replacement with other polymer, or not, as medically indicated.

When not so modified by physiologically active substances, the physiologic saline dispersions of the present polymers are essentially inert, exhibiting only mechanical properties.

EXAMPLE 17

A female guinea pig was lightly anesthetized, and the animal's ventral surface was injected with several approximately 0.25 milliliter amounts of a lightly cross-linked polymer of the present invention, dispersed in physiological saline to obtain a swollen, coalescent gel. The injections were carried out at relatively regularly spaced sites along parallel lines extending the normal lines of the natural mammary protuberances. Upon completion of the injection, the animal gave the superficial impression of being provided with approximately twice the normal number of lacteal sites. The animal was permitted to regain consciousness, and was thereafter maintained for a period of approximately 6 months under conditions generally favorable to the growth and well being of the guinea pig. The injected sites were periodically manipulated with a view to determining whether the original contour would change perceptibly as by further separation of cutaneous from underlying tissue, and with a further view to eliciting inflammation if tendency thereto were noted. The animal was examined carefully at relatively frequent intervals, and, at the time formal observation and recording of the experiment were discontinued, some months later, the animal showed no evidence of discomfort; the injected areas had shown no perceptible tendency to spread and flatten, no inflammation or local febrility was noted; and the injected sites had shown essentially no tendency to shrink as by resorption into the body of their sorbed water.

EXAMPLE 18

An experimental baby diaper is prepared by providing a first outer layer of thin plain nylon broadcloth approximately 20 inches square. Over and upon this, avoiding approximately 2 inches of outer edge is applied approximately 2 grams, relatively uniformly, of finely subdivided cross-linked copolymer of acrylamide and sodium acrylate as prepared in Example 6. Over this copolymer is applied a second fabric layer essentially the same as the first. With minimal disturbance of the distribution of the polymer, the two layers are sewed together by quilting at regular half-inch intervals and securely hemmed at the edge. In the resulting diaper, the confining nylon fabric layers have so little sorptive quality as to be ignored.

After completion of its fabrication, the diaper is weighed, and thereafter put into use in personal management of a baby of approximately 6 months age.

After approximately 4 hours, the diaper is removed and reweighed. The weight gain is found to be approximately 120 grams, representing the take-up of approximately 60 weights of urine per weight of polymer employed.

EXAMPLE 19

The present example essentially repeats Example 18, foregoing, except that, in preparation, the particulate polymer is lightly moistened and, with continuous stirring, modified by the inclusion therein of a non-toxic antiseptic adapted for external use ("hexachlorophene").

The polymer is thereafter dried and reground, and employed in exactly the manner described in Example 18, foregoing.

The diaper of the present example and that of Example 18, foregoing, are used in essentially similar manners, are loaded with urine in approximately similar amounts, and are thereafter separately disposed in loosely closable vessels employed to hold used baby diapers.

In these vessels, they are held in unmodified condition for two days, the vessels thereafter opened and inspected.

The vessel in which the unmodified diaper is disposed presents a strong odor of ammonia. The vessel in which the polymer is modified by the employment of the antiseptic has of little or no odor.

EXAMPLE 20

In known procedures, there is formed a sheet of water-insoluble polyurethane foam about 5 millimeters thick, having abundantly interconnected cells, modified in that, just prior to foaming, it is heavily loaded by mixing thoroughly and uniformly with it a weight of the lightly cross-linked polymer of Example 6 in an amount about equal to the weight of the polyurethane resin. The resulting foam sheet is then backed by a sheet of polyethylene which is affixed with a cement.

From this sheet is cut a 24 inch square which is then employed as a disposable baby diaper in the manner described in Example 18, so disposed that the foam surface is towards the body of the baby, the polyethylene sheet away.

After four replications of the test, it is found to be a highly satisfactory baby diaper.

EXAMPLE 21

In the present example, the polymer is that prepared in Example 6; however, in its production, upon completion of cross-linking and polymerization, the resulting gel is extruded in known manner through orifices to produce filaments of the polymer. Together with synthetic cellulose ester fibers as mechanical support, the two kinds of fibers in approximately equal weights, dry, it is felted and fixed to obtain a "nonwoven" fabric. This is employed as a baby diaper and, when accompanied by conventional waterproof outer covering, is completely satisfactory.

The fibers can be woven or knitted, if the felted fabric is, in any application, unsatisfactory.

It is contemplated that, in practical use, the confining structure for particulate polymers of the present invention need not be an expensive fabric. In view of the described difficulty of removing aqueous fluids from the polymers of the present invention, it is contemplated that a disposable diaper will be of greater use than one intended for processing and reuse.

Thus, instead of the nylon fabric above described in the experimental diapers, it is contemplated that wet-strength, perhaps creped paper and the like will be employed as confining structures. In such application, in view of the rapid and prolonged imbibition of aqueous fluids characteristic of the present polymers, it will be necessary to distribute the polymer over only relatively small portions of the entire diaper area, and unnecessary to distribute it over portions of which the essentially only function is to permit bodily attachment. In fact, by the use of a belt or the like whereby to hold a very small diaper in position, it is contemplated that the employment of a relatively small diaper, carefully positioned, will give entirely satisfactory results.

If desired, the particulate polymers of the present invention can be dispersed in a pulp slurry in a Fourdrinier machine for making paper, whereby the polymer particles are distributed within and intimately through the structure of a paper such as a wet-strength paper adapted to be employed in the production of a baby diaper or the like.

When this technique is employed it will usually be desired to provide drying means which can be vacuum drying means for the removal of moisture from polymer particles embedded within the paper, and, in the ultimate fabrication of a usable diaper, it will be desired to provide exterior layers covering the polymer-particle-bearing layer. The moistened polymer particles of the present invention tend to be highly lubricious and this is aesthetically unappealing to many persons. The problem is obviated by lamination of the resulting paper with external layers of paper not bearing the said polymer. When the lamination is undertaken at a time before the polymer particles have been completely dried, certain natural adhesivity characteristic of the polymer particles can be used to effect the lamination bonding desired.

Also, because in diaper and similar use, support is considered to be essential and critical to the best use of the polymers herein, but because sorbency is a property manifest by the polymers rather than by the support, it is contemplated also to employ an essentially water-impermeable support which can be a resinous, water-insoluble polymeric sheet material, such as sheet polyethylene, polyvinyl chloride, reconstituted cellulose, and the like.

This can be used as sole support, or as a shield or barrier layer in conjunction with a permeable support structure such as a fabric.

In view of the general teaching hereinbefore embodied and the examples set forth, those skilled in the art of preparation of absorptive members for sorption of aqueous fluids will find numerous other embodiments within the scope of the present invention.

In the present specification and claims use of the term "animal" is intended to comprehend human beings.

We claim:

1. As an article of manufacture, a flexible support adapted to be caused to conform to a surface of an animal body, said support confining a dry, solid, water-swellable, water-insoluble, physiologically unobjectionable polymeric sorbent so as to present said sorbent for the sorption of aqueous fluid elaborated by an animal to which said article is applied and said polymeric sorbent being a lightly cross-linked polymer and being selected from the group consisting of poly-N-vinylpyrrolidone, poly-vinyltoluenesulfonate, poly-sulfoethyl acrylate, poly-2-hydroxyethyl acrylate, poly-vinylmethyloxazolidinone, hydrolyzed polyacrylamide, polyacrylic acid, copolymers of acrylamide and acrylic acid, and alkali metal salts of such of said polymers as contain sulfonate or carboxylate groups.

2. Article of claim 1 wherein the polymeric sorbent is a lightly cross-linked, partially hydrolyzed polyacrylamide.

3. Article of claim 1 wherein the polymeric sorbent is a copolymer of acrylamide and acrylic acid cross-linked with from about 0.05 to about 1.5 percent by weight of N,N'-methylenebisacrylamide.

4. Article of claim 3 wherein the support consists of a water-insoluble polyurethane foam.

5. Article of claim 1 in which the support is a fibrous material selected from cloth fabric, paper, synthetic foam resin, and felted fibers.

6. Article of claim 1 in which the polymer is originally supplied to the said article as a particulate solid.

7. Article of claim 1 in which the polymer is originally supplied to the said article as elongate fibers, of which one dimension is substantially greater than the other two.

8. As an article of manufacture, a flexible support adapted to be caused to conform to a surface of an animal body, said support confining a dry, solid, water-swellable, water-insoluble, physiologically unobjectionable polymeric sorbent so as to present said sorbent for the sorption of aqueous fluid elaborated by the animal to which said article is applied and said polymeric sorbent being a lightly cross-linked polymer and being selected from the group consisting of hydrolyzed polyacrylamide, polyacrylic acid, copolymers of acrylamide and acrylic acid, and alkali metal salts of said polymers.

* * * * *

PO-1050
(5/69)

UNITED STATES PATENT OFFICE
CERTIFICATE OF CORRECTION

Patent No. 3,669,103      Dated 13 June 1972

Inventor(s) B. G. Harper, R. N. Bashaw, B. L. Atkins

It is certified that error appears in the above-identified patent and that said Letters Patent are hereby corrected as shown below:

On the first page of the patent, line 2 of the title, change "HYDROCELLOIDAL" to --HYDROCOLLOIDAL--.

Column 1, line 2 of the title, change "HYDROCELLOIDAL" to --HYDROCOLLOIDAL--.

Signed and sealed this 19th day of March 1974.

(SEAL)
Attest:

EDWARD M. FLETCHER, JR.
Attesting Officer

C. MARSHALL DANN
Commissioner of Patents